United States Patent Office 3,394,657
Patented July 30, 1968

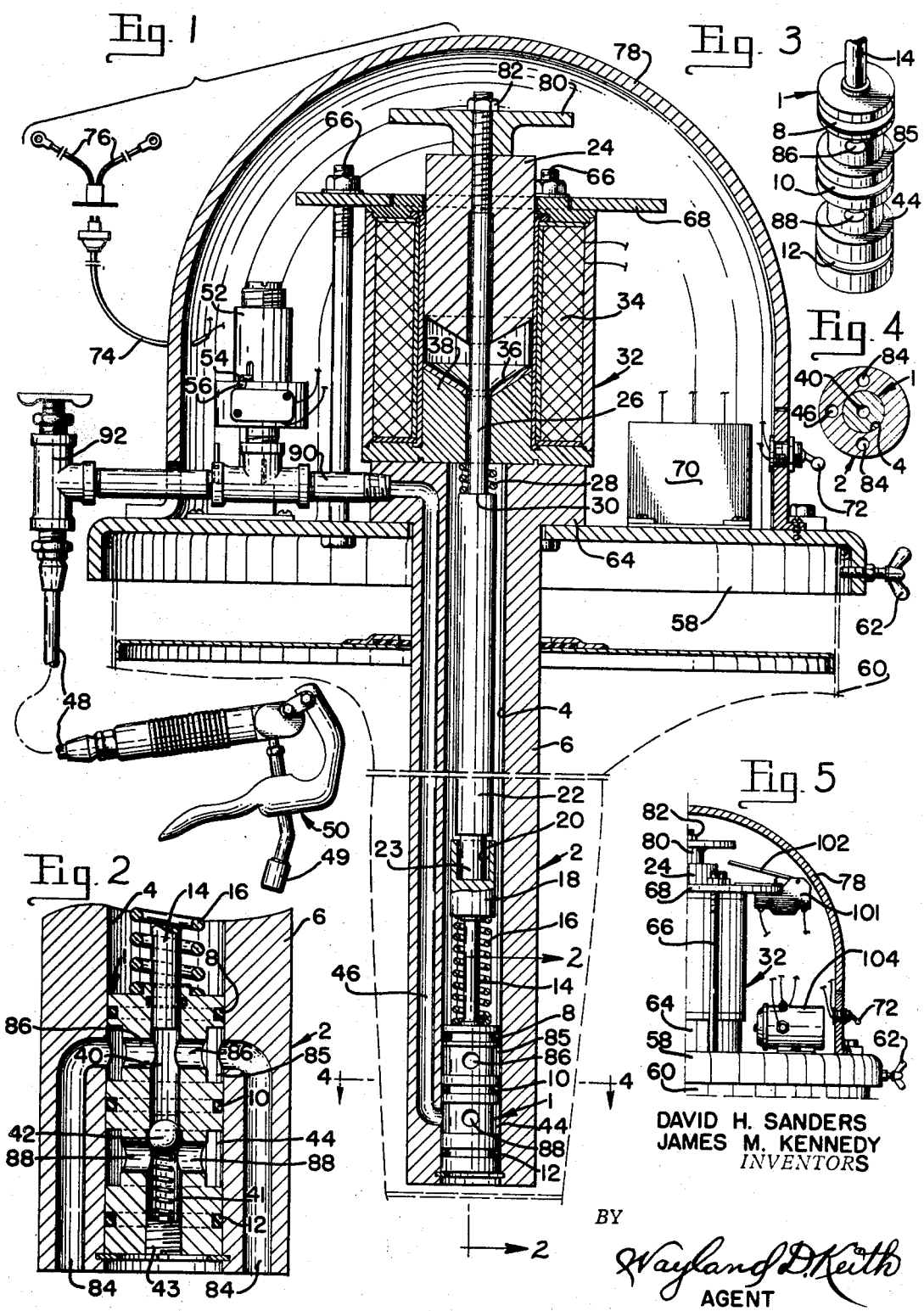
DAVID H. SANDERS
JAMES M. KENNEDY
INVENTORS
BY
Wayland D. Keith
AGENT

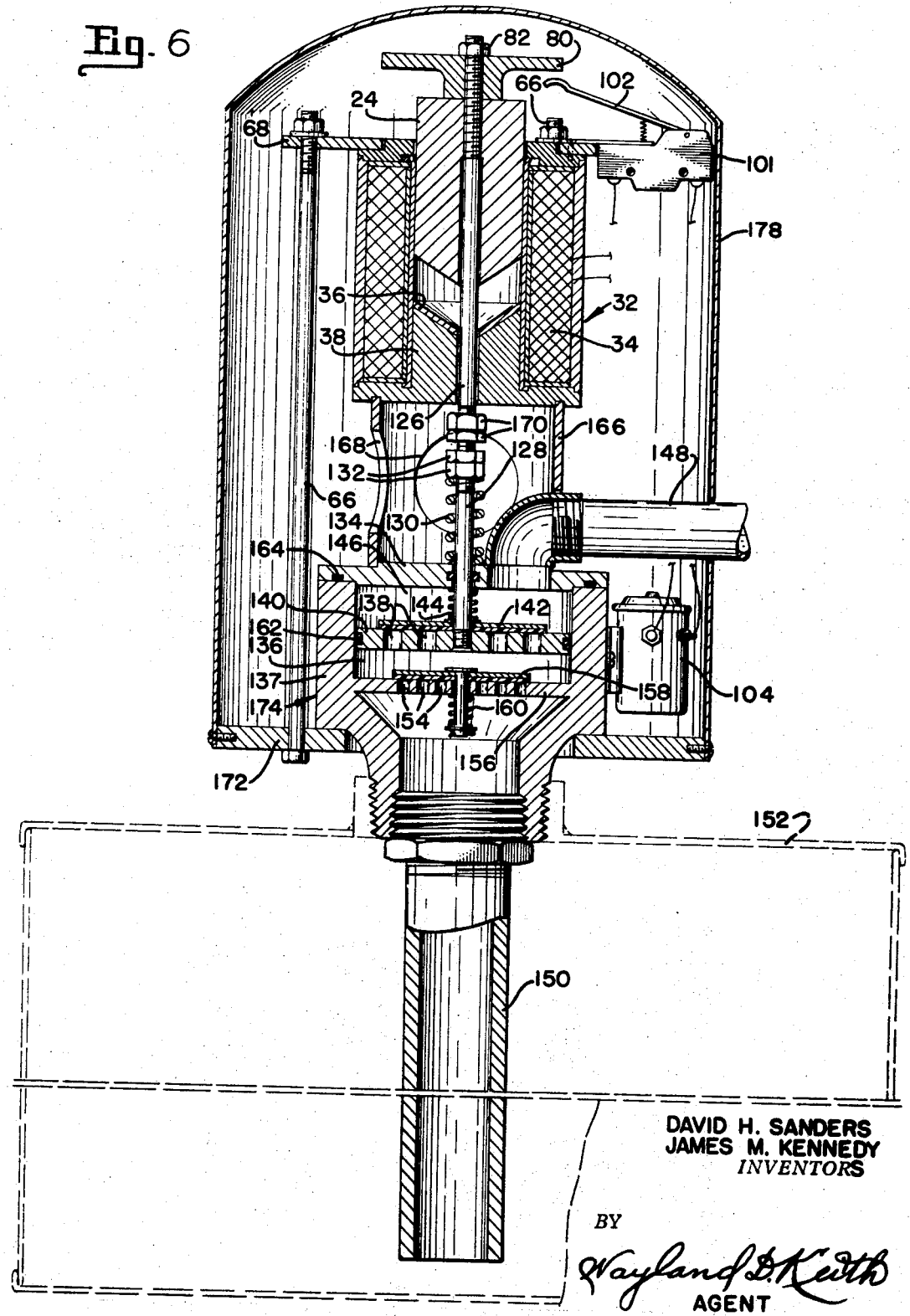

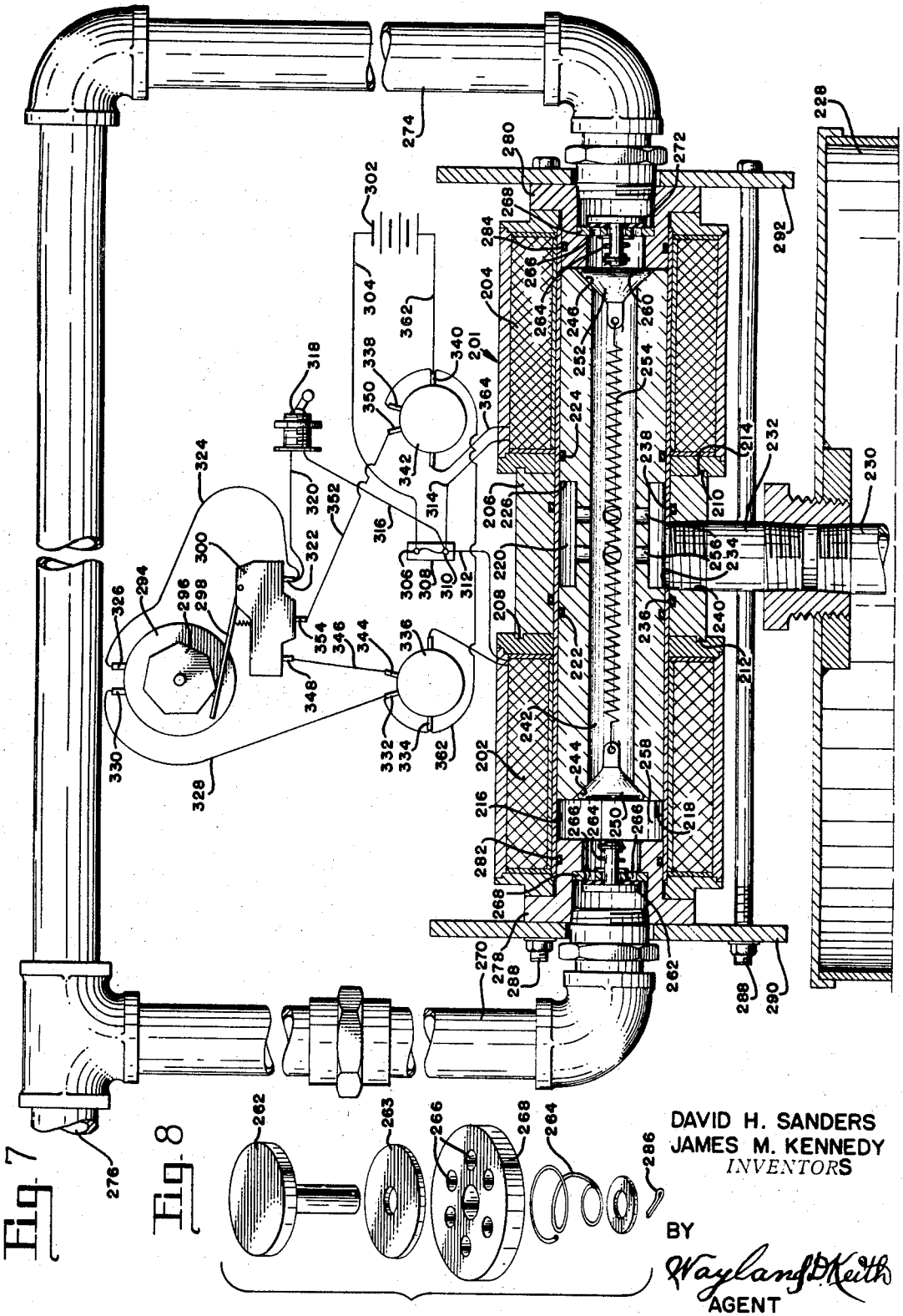

3,394,657
ELECTRO-MAGNETIC, RECIPROCATING
PUMPING MECHANISM
David H. Sanders and James M. Kennedy, Abilene, Tex., assignors of one-third to Wayland D. Keith, Wichita Falls, Tex.
Filed May 27, 1966, Ser. No. 553,358
6 Claims. (Cl. 103—53)

ABSTRACT OF THE DISCLOSURE

An electro-magnetic, reciprocating pump with a bar secured axially of the armature of the electro-magnetic mechanism and which bar is in end to end relation with the plunger of a cylinder and plunger pumping unit. The pumping unit is immersed in a fluid to be pumped, so, upon movement of the plunger in one direction, fluid is drawn into the unvalved inlet opening into the pump cylinder and is discharged, under pressure, through the valved opening into a conduit. Provision is made for resiliently returning the pump plunger to a position to open the inlet opening independently of the movement of the bar mounted axially of the armature. Further provision is made to secure the pump cylinder and plunger unit within the tube in sealed relation so inlet and outlet openings in the cylinder-plunger unit will register with inlet and outlet openings within the tube. A timer is provided to sequentially energize the electro-magnetic mechanism to operate the pumping mechanism.

---

This invention is co-pending with our application, Ser. No. 367,313, for Solenoid Actuated Pressure Pump for Grease Guns And the Like, filed May 14, 1964, now pending.

This invention relates to improvements in pressure pumps and more particularly to magnetically operated pressure pumps for pumping grease, oils, fuels and other liquids, both liquids of high viscosity and of low viscosity.

Various solenoid operated and magnetically operated pumps have been proposed heretofore, but these, for the most part, did not lend themselves to a wide variety of uses, such as transmitting grease at high pressures or transmitting liquids such as diesel oil and the like at low pressures, by the use of substantially the same solenoid actuated mechanism and timing mechanisms, merely by changing the size of the pump and the pressure at which the pump operates.

The present solenoid actuated pump is so designed as to operate over long periods of time with a minimum shut down time for repair and the like, but is so constructed that parts may be readily and quickly installed in a minimum of time.

The present device is so constructed that it has a self-contained prime mover and pumping unit, which may be readily adapted for use with AC or DC current of standard voltage, such as 110 AC, commercial electricity, or with 6, 12 or 24 volt storage batteries, thereby making possible a wide versatility in the use of the present device in practically all fields of endeavor where a pumping unit for handling liquids is used. Furthermore, in the field of lubrication, it may be readily carried to remote areas for servicing equipment which is not readily accessible to air actuated equipment which requires large air tanks, motors, and the like.

The present device is so constructed that, when used for lubrication equipment, a standard hose and grease gun may be attached thereto which will readily enable the unit to operate instantly without waiting for air pressure to build up to an operating pressure level.

An object of this invention is to provide a pumping unit which may be readily adapted for use with fluids of different viscosities so as to pump gases, air, fuel, such as kerosene, gasoline, diesel oil, lubricating oil, and heavy, viscous greases.

Another object of the invention is to provide an electrically energized, solenoid actuated pumping unit which is light in weight and which will dispense fluids under high pressure to a point of use.

Another object of the invention is to provide a solenoid actuated pumping unit whereby the pump is readily separable from the actuating mechanism in such manner that the pump and pump plunger may be changed, so as to accommodate a pump plunger of a different interior bore thereby to dispense either a large volume of fluid under relatively low pressure or a smaller amount of fluid under a higher pressure.

Another object of the invention is to provide a pump which is detachably connected to a solenoid actuated pumping mechanism whereby the pump and plunger may be readily detached and another pump and plunger substituted therefor, by the removal of a single retainer ring.

Still another object of the invention is to provide a self-contained timing system for a solenoid actuated pumping unit which will permit the pump to actuate when pressure drops below a predetermined setting.

Still another object of the invention is to provide an electrical timing system therefor which may be pulsed either by reciprocation of the pump or by a solid state timer unit.

Another object of the invention is to provide a combination solenoid and spring actuated pump whereby the pumping action is performed by the resiliency of a spring.

Another object of the invention is to provide a combination solenoid and spring actuated pump whereby the output pressure of the pump may be regulated by adjusting the tension of the spring.

Still another object of the invention is to provide a double solenoid field with a single reciprocating solenoid plunger therein which is adapted to pass fluid therethrough and discharge fluid axially therefrom.

Another object of the invention is to provide a double solenoid field with a single reciprocating plunger therein, which plunger forms a valved pump plunger for discharging fluid axially therefrom that is being introduced radially thereinto.

Still another object of the invention is to provide a self-contained solenoid and pumping unit that is so constructed as to pass the minimum residual magnetism from one solenoid field to another during the operation thereof.

Another object of the invention is to provide a dual field solenoid, which fields are separate and spaced apart axially by copper barrier elements and which has a copper pipe therethrough so as to enable fluid to be passed axially therefrom.

A further object of the invention is to provide a solenoid operated pumping apparatus that will readily pump paint into a spray nozzle at such pressure that will atomize the paint without the use of air.

Still a further object of the invention is to provide a solenoid actuated pumping unit for pumping refrigerant fluids wherein the unitary armature and pump plunger are in a completely sealed pressurized conduit circuit.

With these objects in mind and others which will become manifest as the description proceeds, reference is to be had to the accompanying drawings in which like reference characters designate like parts in the several views thereof, in which:

FIG. 1 is a longitudinal, sectional view of a solenoid actuated dispensing pump mechanism, with parts shown in elevation and with parts broken away and shortened to bring out the details of construction, and showing a grease dispensing gun on the end of the discharge hose;

FIG. 2 is an enlarged sectional view of the pump mechanism as shown in FIG. 1, and showing the manner of detachably fitting the pump in the lower end of the conduit;

FIG. 3 is a perspective view of the pump shown apart from the pumping unit, with a portion of the pump plunger shown therein;

FIG. 4 is a sectional view taken on the line 4—4 of FIG. 1, looking in the direction indicated by the arrows;

FIG. 5 is a view of an alternate form of timing mechanism, which utilizes a positive actuated mechanical switch;

FIG. 6 is a longitudinal, vertical, sectional view through a second form of the pumping unit, with parts shown in elevation to bring out the details of construction;

FIG. 7 is a longitudinal, sectional view through a third form of the invention showing a double solenoid field with a single reciprocating solenoid armature which forms a valved plunger within a pump for operation within the solenoid fields, showing the unit installed on a supply tank, and showing discharge pipes leading from the self-contained pumping unit; the timing mechanism being shown diagrammatically; and FIG. 8 is an exploded view of a valve assembly of the third form of the invention.

With more detailed reference to the drawings, the form of the invention as shown in FIGS. 1 through 4, discloses a solenoid actuated plunger, with the pump 1 fitted in the lower end of an eduction tube 2, which pump may be of a standard outside diameter to fit within the bore 4 of the tube 6, with O-rings 8, 10, and 12 forming a fluid-tight seal between the inner diameter of the bore 4 and the pump 1. The bore 4 is sufficiently large to accommodate the largest bore pump 1 to be used therein.

The pump 1 has a plunger 14 therein with a spring 16 surrounding the plunger 14 and seating on top of pump 1, and having the upper end thereof in bearing relation against a thimble 18, which has a bore 20 therein for a portion of the length thereof in which is loosely fitted the lower end 23 of an inertia bar 22 that is secured in fixed relation to the solenoid armature 24. The portion of the inertia bar 22 is reduced as indicated at 26 to threadably receive the solenoid armature 24. A spring 28 seats upon the shouldered portion 30 of inertia bar 22 and bears against the lower side of the solenoid generally designated by the numeral 32. The armature 24 is energized by the solenoid coil 34 of solenoid 32 to move the armature downward, which in turn will cause inertia bar 22 to move thimble 18 and pump plunger 14 downward. However, upon the armature 24 seating on the seat 36 of solenoid anvil 38, the inertia bar 22, thimble 18, and pump plunger 14 will move downward to a position indicated in dashed outline in FIG. 2, whereupon the fluid trapped in pump cylinder 40 will be directed outward past check valve 42 into annular passage 44 surrounding pump 1 and thence up through longitudinal passage 46 to be discharged out through hose 48 and nozzle 49 of grease gun 50, if the pump is being used to pump grease or the like.

When the pressure builds up within passage 46, a pressure actuated valve 52 will cause pin 54 to move upward to open switch 56, which will de-energize solenoid coil 34 and the unit will cease pumping until the pressure drops below a predetermined pressure setting.

A cover plate 58 is provided, which cover plate is adapted to fit over the top of a receptacle 60 in which grease or other fluid is stored. Circumferentially spaced wing screws 62 are provided to secure the cover plate 58 to receptacle 60. The cover plate 58 provides a base for mounting the shouldered portion 64 of tube 6.

The solenoid 32 seats in piloted relation on the upper face of the shouldered portion 64 of tube 6 and is clamped in place by bolts 66 which pass through holes in cover plate 58 and through holes in a ring 68 so as to hold the solenoid 32 in aligned relation with the bore 4 of tube 6.

Various systems of timing may be utilized to sequentially time the reciprocation of solenoid armature 24. However, in the form of the invention as shown in FIG. 1, a solid state timer 70 is utilized, which timer will pass current of sufficient voltage and amperage at periodic intervals, usually from 400 to 800 cycles per minute, to reciprocate solenoid armature 24 a like number of reciprocations. However, timers of this character are well known in the art of solid state timers, and a diagrammatic represenation thereof is not considered necessary.

The unit has a toggle switch 72 within a circuit which leads a source of electricity, such as a storage battery or commercial AC current, either to open or to close the main circuit, or to a control-circuit which controls the flow of current through the solid state timer 70. An extension cord 74 is shown to lead to a source of electricity as indicated at 76. The unit preferably has a housing 78 thereover to protect the mechanism and circuitry.

*Operation*

The present device operates in substantially the same manner as the form of the invention as shown in FIGS. 10, 11, and 12 in the co-pending application; however, the present form of the invention is shown to utilize a solid state timer.

The present device has an inertia bar 22 with the reduced threaded portion 26 thereof made integrally therewith. The upper reduced portion 26 is screwthreaded and is engageable with the screwthreaded portion of solenoid armature 24. A screwthreaded, flanged member 80 threadably engages the reduced threaded portion 26 of inertia bar 22, and a lock nut 82 bindingly engages the screwthreaded, flanged member 80 to hold the threaded, flanged member in adjusted relation with respect to the solenoid armature 24. The lower end of the inertia bar 22 has a reduced end portion 23 which loosely interfits within the thimble 18 thereby to prevent binding between the pump plunger 14 and the inertia bar 22. This enables the pump plunger 14 to move freely within the cylinder 40 of the pump 1. This enables the fluid such as grease, paint or the like to be sucked in through inlet openings 84 into cylinder 40, then, upon downward movement of plunger 14, the ports 86 are closed so the fluid will be discharged downward by ball check valve 42 to be discharged out through ports 88 into annular passage 44, which is in register with a longitudinal passage 46 in tube 6, which passage extends upward and connects with pipe 90, which pipe is in fluid communication with pressure relief valve 52, and with air bleeder valve 92 and hose 48.

The thimble 18 has a boss on the lower end thereof which pilots a compression spring 16 intermediate the lower end of the thimble and the upper end of pump 1, so upon deenergization of solenoid coil 34, the spring 16 will move plunger 14 upward to uncover port 86, which will cause a suction within cylinder 40 to cause fluid to be drawn in through inlets 84 into annular groove 85 and thence into port 86 to fill cylinder 40 with fluid. A spring 41 is provided beneath ball 42 to seat the ball in the lower end of cylinder 40. A screwthreaded plug 43 threadably engages the lower end of pump 1 by which to adjust the tension of spring 41.

A modified form of timer is shown in FIG. 5 wherein a normally "on" switch 101 is provided, which has an outstanding arm 102 thereon that is adapted to be contacted by the flange of threaded member 80 as the solenoid armature 24 moves downward, which will break the control circuit leading to a solenoid operated switch 104 in a manner as disclosed in the aforementioned application, particularly FIGS. 10 and 11. The operation of this form of the invention otherwise is the same as the form of the invention as shown in FIGS. 1 through 4.

*Second form of the invention*

The form of the invention as shown in FIG. 6 utilizes the same type of solenoid as the form of the invention shown in FIGS. 1 through 5, and which solenoid may be timed for sequential operation either by a mechanically operated timer or by a solid state timer. However, for purposes of illustration, a switch 101 is utilized which switch has an outstanding arm 102 thereon which is engageable by the outer periphery of the flange of screwthreaded member 80 upon downward movement of solenoid armature 24, which elements form a mechanical timing device, which opens the circuit in the same manner as the aforementioned form of the invention. Upon downward movement of armature 24, an armature plunger 126 is moved downward against pump plunger 128 to compress a compression spring 130 which spring surrounds pump plunger 128 and which spring is biased between adjusting nuts 132 on the upper end and pump head 134 at the lower end of the pump plunger. As the plunger 128 moves downward, fluid entrapped in chamber 136 in housing 137 of shouldered pump 174 will flow upward through holes 138 in pump piston 140 to open spring pressed valve 142, which valve preferably has a normally weak spring 144 biased between the upper face of valve 142 and the lower face of pump head 134. Upon the movement of screwthreaded, flanged member 80 downward a sufficient distance to cause arm 102 to open switch 101, the solenoid coil 34 will be deenergized and the solenoid armature 24 will return to position, as indicated in FIG. 6, under the influence of spring 130. However, upon the upward movement of pump plunger 128, under the influence of spring 130, the fluid within chamber 146 will be discharged outward through pipe 148.

Upon upward movement of piston 140, a suction is created in chamber 136 which will draw fluid such as water, oil, diesel fuel and the like, upward through pipe 150 from reservoir 152 into and through holes 154 in valve plate 156 to lift valve 158 against tension of spring 160, whereby the fluid will flow into chamber 136 so long as the upward movement of piston 140 continues. Upon the reversal of piston 140, the sequence of pumping operation, as set out above, will be had.

The piston 140 is shown to have a sealing element 162 around the periphery thereof, which, in the present instance, is shown to be an O-ring. The chamber 144 is sealed around the upper edge thereof by a peripheral sealing element 164 which, in the present instance, is shown to be an O-ring.

It is to be pointed out that the solenoid armature 24 may be timed to operate at the desired number of cycles per minute to create best pumping efficiency; and, due to the large volume of fluid handled by the present pump, the pipes 150 and 148 may be considerably larger than the conduits shown in the first mentioned form of the invention.

The present solenoid is seated in piloted relation on a ring 166, which seats in piloted relation on the head 134 of the pump. Holes 168 are provided in the sides of ring 166 by which to gain access to the adjusting nuts 132 and nuts 170. The solenoid 32 is held in secure relation by bolts 66 which pass through an annular ring 172 below the shouldered pump 174 and through a ring 68 which surrounds the upper portion of the solenoid 32 in a manner similar to that described in the aforementioned form of the invention. A cover 178 is provided and is secured to ring 172 to prevent damage to the mechanism and to the circuitry.

This form of solenoid operated pump does not require a pressure switch as the pressure is automatically controlled in accordance with the setting of tension of spring 130 by adjusting nuts 132 on pump plunger 128. As the pressure is built up in discharge pipe 148 to a pressure that spring 130 will not return piston 140, the screwthreaded, flanged member 80 will maintain switch arm 102 depressed to maintain the contacts within switch 101 open until such time that the pressure in chamber 146 is less than the force exerted by spring 130.

A toggle switch 72 is connected within a circuit to enable the current leading to solenoid actuated switch 104 and switch 101 to be interrupted to enable the unit to be immobilized.

*Third form of invention*

The third form of invention, as shown in FIGS. 7 and 8, utilizes a reciprocating solenoid motor 201 which has solenoid coils 202 and 204 thereon, which coils are spaced apart by a non-magnetic ring 206, which ring may be made of copper, aluminum, plastic or the like. Adjacent ends of the solenoid coils 202 and 204 each has an annular groove formed therein, designated at 208 and 210 respectively, which grooves are axially aligned to receive complementary annular, axially aligned bosses 212 and 214 on non-magnetic ring 206. The solenoid coils 202 and 204 have a non-magnetic, cylindrical sleeve 216 passing therethrough and through non-magnetic ring 206, which sleeve 216 enables a reciprocating armature which forms a valved plunger, designated generally at 218, to reciprocate to create a suction within chamber 220 of sleeve 216. The armature which forms a valved plunger 218 has O-rings 222 and 24 associated therewith and with the sleeve 16 to form a seal between the armature which forms the valved plunger and sleeve 216, to form a self-contained piston pump, with the solenoid coil 202 moving armature 218 in one direction, upon energization of solenoid coil 202 and moving the armature 218 in the opposite direction upon energization of solenoid coil 204.

The armature which forms the valved plunger 218 has an annular groove 226 formed therein, intermediate the length thereof, which groove, when considered with the wall of cylindrical sleeve 216, forms a chamber into which fluid is drawn from reservoir 228 through pipe 230 and pipe 232. The sleeve 216 has an opening 234 formed therein for passage of fluid from pipe 232 into chamber 220. The chamber 220 is maintained in fluid tight, sealed relation by O-rings 236 and 238 on each side of opening 234 formed intermediate the length of the outer diameter of sleeve 216 and the inner diameter of non-magnetic ring 206. The non-magnetic ring 206 has a screw threaded opening 240 formed therein to register with opening 234 in sleeve 216.

The solenoid armature which forms a valved plunger 218 has an axial opening 242 formed therethrough, with valve seats 244 and 246, respectively, formed at the opposite ends thereof, with valves 250 and 252 seating on the respective valve seats 244 and 246, which valves are held in seated relation by a tension spring 254 connected therebetween.

The solenoid armature which forms a valved pump plunger 218 has transverse holes 256 formed therein, which holes interconnect chamber 220 in sleeve 216 with the axial opening 242 within solenoid armature which forms a valved pump plunger 218. When the solenoid armature-pump plunger 218 is is in the position as indicated in FIG. 7, a chamber 258 is formed at the left end of sleeve 216, however, when in the oposite position, a chamber 260 is formed at the opposite end of sleeve 216. However, the annular groove 226 in solenoid armature-pump plunger 218 is of such length that it is always in communication with opening 234 in sleeve 216, which permits suction of fluid from reservoir 228 through pipe 230 into pipe 232 and through opening 234, transverse openings 256 in the grooved portion 226 of solenoid armature-pump plunger 218 which admits fluid into axial oening 242 in plunger 18, and, upon movement of solenoid armature-pump plunger 218 from left to right, and with valve 252 closed by valve spring 264, fluid will be drawn into chamber 258 from axial opening 242 in solenoid armature-pump plunger 218. The opposite movement of solenoid armature-pump lunger 218, valve 250 will be closed, which will force fluid outward through holes 266 in valve seat 268 to cause sring 264 to yield to discharge fluid outward into pipe 270. During this cycle of motion, with valve 250 being closed, fluid is drawn into chamber 260 by valve 252, as valve 272 is closed. At the extreme end of the stroke of solenoid armature-pump plunger 218 to the left end of cylindrical sleeve 216, the valve 262 will close, as will valve 252, whereupon, the movement of solenoid armature-pump plunger 218 to the right will expel fluid being pumped from chamber 260 by valve 272 into pipe 274, which pipe referably connects with a common discharge pipe 276.

The valves 262 and 272 each preferably has a ground surface or a soft seat, such as an elastomer, plastic, or the like, as indicated at 263, FIG. 8, which seats onto removable valve seat 268, which may be pressed into place in a removable piston head 278. A piston head 280 is provided in the outer end of sleeve 216, within solenoid coil 204. It is preferable to have O-rings 282 and 284 intermediate the piston heads 278 and 280. A pin 286 passes through the stem of valve 262 and a like pin passes through the stem of valve 272 to hold valves in seated relation, as will best be seen in FIG. 7.

The solenoid coils 202 and 204 are held in binding engagement with non-magnetic sleeve 216 by bolts 288, which bolts are circumferentially spaced around coils 202 and 204 and are parallel to the axis thereof. The bolts pass through apertured rings 290 and 292 which press on the respective piston heads 278 and 280 to bindingly engage the solenoid coils 202 and 204 and the non-magnetic ring 206 to form a composite, unitary pumping assembly.

This form of the invention is operated by a constant speed timing motor 294, which is preferably of the gear reduction type, and which has a multi-lobe cam 296 on the shaft thereof. The lobes of the cam 296 are adapted to engage an arm 298 of a switch 300, which switch has a set of normally closed contacts therein and a set of normally open contacts therein. The arm 298 may be actuated to open the normally closed contacts, when in one position, and to simultaneously close the normally open contacts.

The source of electricity may be either AC or DC current; however, for simplicity of operation, a battery 302 is shown, which battery has one lead wire leading to terminal 306 of a thermal breaker or fuse 308. A second terminal 310 has a conductor wire 312 leading therefrom to form one side of a circuit to solenoid coil 202, and a wire 314 leads to one side of the circuit to solenoid coil 204, however, a third wire 316 from terminal 310 leads to an "off and on" switch 318, which in turn has a wire 320 leading therefrom to a terminal 322 on switch 300. A conductor wire 324 leads from terminal 322 to terminal 326 on motor 294. A conductor wire 328 leads from terminal 330 on motor 294 to the respective terminals 332 and 334 on relay 336 and to terminals 338 and 340 on relay 342. With a control circuit in relay 336 feeding through terminal 344 into conductor wire 346 to terminal 348 on switch 300, which, for purposes of illustration, may be designated the terminal of normally closed switch points in switch 300, and the control circuit in relay 342 leads from terminal 338 through relay 342 to terminal 350 and to conductor wire 352 to terminal 354, which terminal connects with normally "open" contact points in switch 300.

It is to be pointed out that with the common wire 320 being connected to switch 300, so as to alternately switch the control circuits from wire 346 to wire 352, the control circuits will actuate the heavy current carrying circuits to complete a circuit from battery 302 through conductor wire 304, thermal breaker or fuse 308 into wire 312 and through solenoid wire 358 and through the heavy current carrying points (not shown) in solenoid 336 to wire 362 leading to the opposite terminal of battery 302.

Upon control circuits 346 and 320 being opened and control circuits 320 and 352 being closed, the relay 336 will be de-energized and relay 342 will be energized, which, in turn, will direct current from terminal of battery 302 through conductor wire 304, thermal breaker or fuse 308 and through conductor wire 314, solenoid coil 204, thence through conductor wire 364 through a heavy current carrying relay points (not shown) in relay 342, thence through conductor wire 362 to the opposite terminal of battery 302.

The energization of solenoid coils 202 and 204 will be brought about by the opening and closing of points within switch 300, as the lobes of cam 296 actuate arm 298 of switch 300.

The rapidity with which solenoid armature-pump plunger 218 is actuated is directly proportional to the opening and closing of the points within switch 300 by rotation of cam 296, and, if desired, the motor 294 may be of the variable speed type, so as to vary the pump speed and the capacity of the pumping unit.

While the operation of the solenoids and armature have been described in some detail with respect to a mechanically operated switch actuated by a motor driven cam 296, the sequential energization and de-energization of solenoid coils 202 and 204 may be accomplished by a solid state timer which is pulsed to energize and de-energize the respective solenoid coils 202 and 204 in accordance with the predetermined firing of the solid state timer. However, the pumping action will be performed in the same manner, regardless of the system of timing.

The present device is particularly desirable for use with a closed conduit system for handling fluids, such as refrigerants, as the inlet pipe 230 from reservoir 228 is in fluid communication with the axial opening 242 in reciprocating solenoid armature forming a valved pump plunger 218 in such manner that little or no pressure head is had at the starting of the pumping operation.

Furthermore, it is to be pointed out that the pump runs at a minimum temperature, which also keeps the solenoid coils 202 and 204 cooled, due to the fluid flowing axially therethrough to dissipate the heat generated by the change of energy from electrical power to mechanical power.

The present solenoid actuated pumping system, which utilizes a magnetically attractable armature as a valved pump plunger, which is of such construction that the magnetically attractable armature which forms the pump plunger may be within a completely sealed fluid system which does not use shafts, packing glands or a piston of which pressure is on one side thereof and which piston is open to atmospheric or crankcase pressure on the other side. Therefore, the present pump unit may be installed in inaccessible places that are not readily maintained as it is free of operational difficulties caused by oil seals, packing glands and the like as the present system utilizes a magnetic field of the respective solenoid coils to induce magnetic fields to reciprocate the armature from outside a closed, sealed conduit circuit such as may be used in refrigerating circuits and the like. Since pressures may be obtained in accordance with the power impressed on the armature by the solenoid field, the present pump has a wide variety of uses and various powers.

In a fluid circuit such as a refrigerating circuit, that is closed and is subject to equalization of pressure after a period of time, the magnetically attractable armature forming a valved plunger is solely within the closed conduit circuit, and when the pressure is equalized on the inlet side of the plunger and the outlet side, the pump will not be operating to start against a head pressure as is common in some systems.

The pumping unit is easily assembled and disassembled and has comparatively few working parts for the operation performed, and is sufficiently light in weight that it may be readily adapted to a variety of pumping operations, such as pumping water, volatile fluids, refrigerants, and for use in refrigerating systems.

While the use has not been illustrated to show the closed piping circuitry of a refrigerating system, it is to Having thus clearly shown and described the invention, what is claimed as new and desired to be secured by Letters Patent is:

1. A pump mechanism for pumping fluids, which comprises;
   (a) an electro-magnetically actuated mechanism,
      (1) a longitudinally movable armature associated with said mechanism,
   (b) a bar secured to said armature axially thereof and extending outward therefrom,
   (c) a tube surrounding said bar,
   (d) a composite, detachable pump cylinder and plunger unit mounted within said tube,
      (1) said pump cylinder having an inlet opening formed therein,
      (2) said pump cylinder having an outlet opening formed therein,
      (3) said plunger of said cylinder and plunger unit extending into said pump cylinder for reciprocation therein,
      (4) an end of said pump plunger complementally contacting an end of said bar in end to end relation,
   (e) a spring associated with said pump plunger for returning said pump plunger to a normal position independently of the bar secured to said armature when said electromagnetically actuated mechanism is de-energized,
   (f) an electrical circuit associated with said electromagnetically actuated mechanism for applying electrical current thereto,
      (1) timing means to selectively direct electrical current to said electro-magnetically actuated mechanism.

2. A pump mechanism as defined in claim 1; wherein
   (a) said pump clyinder disposed within said tube has at least three sealing members thereon which sealing members are spaced apart longitudinally on said pump cylinder and are in sealing relation with said tube,
      (1) a passage surrounding said pump cylinder between pairs of said sealing members,
      (2) said fluid inlet opening formed in said pump cylinder is intermediate two of said sealing members,
      (3) said fluid outlet opening being formed in said pump cylinder intermediate two said sealing members,
      (4) a passage in communication with said fluid outlet opening to direct fluid outward from said pump cylinder,
      (5) fastening means for detachably securing said pump cylinder and plunger unit within said tube.

3. A pumping mechanism as defined in claim 2; wherein
   (a) said fastening means detachably securing said pump cylinder and plunger unit within said tube is a retanner ring,
   (b) said tube has an annular groove formed therein near the end thereof opposite said electro-magnetically actuated mechanism to complementally receive said retainer ring therein,
      (1) said retainer ring extending inwardly from said tube to form an abutment for an end of said pump cylinder to seat thereon.

4. A pump mechanism as defined in claim 1; wherein
   (a) the inlet opening of said pump cylinder is in open, unvalved communication with the fluid being pumped,
   (b) said reciprocating plunger extending into said pump cylinder being adapted to move to a position to open said inlet opening upon reciprocation in one direction, and
      (1) to move across said inlet opening to close said opening and to discharge the fluid being pumped, upon the reverse reciprocation thereof.

5. A pump mechanism as defined in claim 1; wherein
   (a) a timing means for selectively directing electrical current to said electro-magnetic mechanism is a solid state timer.

6. A pump mechanism as defined in claim 4; wherein
   (a) said fluid being pumped by said pump and plunger unit is paint, and
   (b) wherein a nozzle is associated with the discharge thereof to provide a spray of paint therefrom.

References Cited

UNITED STATES PATENTS

| | | | |
|---|---|---|---|
| 1,257,613 | 2/1918 | Kocourek | 103—53 |
| 1,598,792 | 9/1926 | Wallace | 103—53 |
| 2,382,426 | 8/1945 | Kocker | 103—53 |
| 2,578,902 | 12/1951 | Smith | 103—53 |

ROBERT M. WALKER, *Primary Examiner.*